(12) United States Patent
Behrens et al.

(10) Patent No.: US 8,730,124 B2
(45) Date of Patent: May 20, 2014

(54) SELF-DEPLOYING HELICAL ANTENNA

(75) Inventors: Jörg Behrens, Delmenhorst (DE);
Joachim Block, Braunschweig (DE);
Lars-Christian Hauer, Bremen (DE);
Tom Spröwitz, Bremen (DE); Rainer Schütze, Braunschweig (DE); Martin Schütze, Soest (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 413 days.

(21) Appl. No.: 13/154,780

(22) Filed: Jun. 7, 2011

(65) Prior Publication Data
US 2012/0146880 A1    Jun. 14, 2012

(30) Foreign Application Priority Data
Dec. 8, 2010  (DE) ............... 20 2010 013 085 U

(51) Int. Cl.
*H01Q 1/36*    (2006.01)
(52) U.S. Cl.
USPC .......................................................... 343/895
(58) Field of Classification Search
USPC .................................................. 343/873, 895
See application file for complete search history.

(56) References Cited

U.S. PATENT DOCUMENTS

| | | | |
|---|---|---|---|
| 3,014,516 A | 12/1961 | Mueller | |
| 3,202,998 A | 8/1965 | Hoffman | |
| 4,068,238 A | 1/1978 | Acker | |
| 4,475,111 A | 10/1984 | Gittinger et al. | |
| 4,500,888 A * | 2/1985 | Brandigampola | 343/873 |
| 4,780,727 A | 10/1988 | Seal et al. | |
| 5,048,441 A | 9/1991 | Quigley | |
| 5,188,872 A | 2/1993 | Quigley | |
| 6,137,454 A | 10/2000 | Peck | |
| 7,170,458 B1 | 1/2007 | Weinstein | |
| 7,301,424 B2 * | 11/2007 | Suarez-Gartner et al. | 333/239 |
| 7,817,101 B2 | 10/2010 | Cowles | |
| 2003/0195499 A1* | 10/2003 | Prakash et al. | 606/33 |
| 2005/0270248 A1* | 12/2005 | Wilhelm et al. | 343/788 |
| 2008/0012787 A1* | 1/2008 | Lamoureux et al. | 343/895 |

FOREIGN PATENT DOCUMENTS

| | | |
|---|---|---|
| DE | 690 33 726 T2 | 6/2002 |
| DE | 103 18 885 A1 | 11/2004 |
| DE | 10 2006 047 786 A1 | 4/2008 |
| DE | 10 2007 050 724 A1 | 5/2008 |
| EP | 0 666 612 A2 | 8/1995 |

(Continued)

OTHER PUBLICATIONS

"Himmlisch Jagd auf Eiskristalle," DLR Magazin 126, Jun. 2010.

(Continued)

*Primary Examiner* — Seung Lee
(74) *Attorney, Agent, or Firm* — Thomas | Horstemeyer, LLP

(57) ABSTRACT

A compressible and deployable helical antenna (2) includes a supporting structure (7) having a helical shape. The supporting structure (7) includes a core (18), especially of foamed material, and a carrier layer (19) of composite fiber material, the carrier layer (19) being located on the core (18). An electrically conducting layer (8) is located on the carrier layer (19). An antenna unit (1) includes the compressible and deployable helical antenna (2) and a reflector plate (3). The reflector plate (3) is connected to the helical antenna (2).

21 Claims, 12 Drawing Sheets

(56) References Cited

FOREIGN PATENT DOCUMENTS

| | | | |
|---|---|---|---|
| JP | 09-307339 | A | 11/1997 |
| WO | 91/03847 | A1 | 3/1991 |
| WO | 97/42682 | A2 | 11/1997 |
| WO | 98/20505 | A1 | 5/1998 |
| WO | 03/048737 | A2 | 6/2003 |
| WO | 03/062565 | A1 | 7/2003 |
| WO | 2010/073157 | A2 | 7/2010 |

OTHER PUBLICATIONS

"DLR-Magazine 126: Aus DLR-Nachrichten wird DLR-Magazin", Nov. 6, 2010.

Baeger, et al., "A Self-Deplaying and Self-Stabilizing Helical Antenna for Small Satellites", 61st International Astronautical Congress, Prague, CZ, 2010.

\* cited by examiner

SELF-DEPLOYING HELICAL ANTENNA

CROSS REFERENCE TO RELATED APPLICATIONS

This application claims priority to co-pending German utility model application No. DE 20 2010 013 085.9 entitled "Selbstentfaltende Helixantenne", filed Dec. 8, 2010.

INCORPORATION BY REFERENCE

The invention has been published by the applicants in the magazine "DLR magazin", No. 126, pages 41-43 on Jun. 11, 2010 and in the paper "A self-deploying and self-stabilizing helical antenna for small satellites" on Sep. 28, 2010.

The content of these documents is incorporated by reference herewith.

FIELD OF THE INVENTION

The present invention generally relates to a compressible and deployable helical antenna. The present invention also relates to an antenna unit including a compressible and deployable helical antenna and a reflector plate to which the helical antenna is connected.

Based on the requirements of the International Maritime Organization (IMO), ships having a water displacement of more than 300 GT must use an Automatic Identification System (AIS) to improve maritime safety. Each ship that is equipped with an AIS system sends out ship-specific data that can be received and evaluated by all other ships also including an AIS system and being located within a specific range of distance.

BACKGROUND OF THE INVENTION

Compressible and deployable helical antennas made of metal are generally known in the art. These known antennas include a helical wire made of metal, the metal having the desired electrical conductivity. The helical antenna is compressed or folded in its transporting position, and it is deployed to attain its operating position. The metal wire also determines the deploying movement and the stiffness of the compressed helical antenna such that the helical antenna has a comparatively great mass when the antenna has a respective required size. The antenna in the deployed state has a low structural resonant frequency. Since such helical antennas are especially used on small satellites in outer space, the vibration behavior of the helical antennas strongly influences the attitude and especially the attitude control behavior of the entire satellite. The known helical antenna makes it possible to receive VHF signals although the antenna gain and the antenna pattern are strongly limited.

SUMMARY OF THE INVENTION

The present invention relates to a compressible and deployable helical antenna. The antenna includes a supporting structure having a helical shape, the supporting structure including a core and a carrier layer of composite fiber material, the carrier layer being located on the core. An electrically conducting layer is located on the carrier layer.

The present invention also relates to an antenna unit. The antenna unit includes a compressible and deployable helical antenna and a reflector plate. The antenna includes a supporting structure having a helical shape, the supporting structure including a core and a carrier layer of composite fiber material, the carrier layer being located on the core. An electrically conducting layer is located on the carrier layer. The reflector plate is connected to the helical antenna.

The novel compressible and deployable helical antenna and the corresponding antenna unit guarantee the required mechanical and electrical properties, they have a small shipping volume, a low mass and they make it possible to simply and reliably deploy the antenna from the compressed state.

To fulfill the requirements of the International Maritime Organization (IMO) concerning communication between ships participating in shipping traffic and/or to allow for effectively supervising shipping traffic, satellites including an AIS transmitter and receiver system are used in outer space.

A substantial component of such a new AIS transmitter and receiver system of satellites are compressible and deployable helical antennas. Such antennas have a substantial size such that they cannot be economically transported in their operating condition. Consequently, they are transported in their folded or compressed condition, and they are later deployed for operation.

The new helical antenna can be compressed to attain a very small shipping volume, and it can be later deployed to attain the operating position in a secure manner. At the same time, it has a low mass and a sufficiently high structural resonant frequency. For obtaining these advantageous properties, the carrier structure of the helical antenna serving to attain the mechanical properties has been separated from the electrically conducting layer for attaining the electrical properties. Especially, the carrier structure has a circular cross-section. The core of foam material, especially of hard foam, may be made of polymethacrylimide foam, for example. The core may attain the circular cross-section by grinding. The layer of fiber composite material is arranged on the core. Preferably, this layer is made of one or more fiber braided hoses being drenched in resin.

The electrically conducting layer serving for realizing the desired electrical properties of the helical antenna is especially made of a thin metal coating (for example a braided sleeve of copper) which is placed on the completed carrier structure of fiber composite material. The electrically conducting layer may also be applied to the helical carrier structure by vapor deposition.

The helical carrier structure made of fiber composite material allows for realizing great diameters of the helical antenna without significantly increasing the mass and the weight, respectively, of the antenna, which improves the mechanical and also partly the electrical properties of the helical antenna. In this way, one attains an optimal helical antenna producing a small footprint on the surface of the earth. In the example of use as described herein, the AISat, the helical antenna may have a length of approximately 4 m and a diameter of approximately 600 mm in the deployed condition, for example. In the compressed condition, the helical antenna then only has a length of approximately 100 mm and a slightly increased diameter.

Control cords extending in an axial direction may be arranged between radial outer portions of the helical carrier structure such that they define the shape of the helical antenna in its deployed condition. The cords extend parallel to the longitudinal center axis of the helical antenna, and they determine the exact length, the angle of inclination and the diameter of the helical antenna. The control cords are connected to the beginning and to the end of the helical antenna, and they may extend through small tubular sections arranged therebetween. The tubular sections may be arranged at the windings of the helix of the helical antenna in a tangential direction such that they allow for passage of the control cords parallel to the longitudinal center axis. The length of the tubular sections is not greater than the diameter of the material of the helical antenna. Such an exact determination of the length, the diameter and the angle of inclination of the helical antenna serves to attain an effective antenna.

Especially, the helical antenna is produced longer than its deployed state such that it is tightened and contracted, respectively, by the control cords to attain the desired length, the desired diameter and the desired angle of inclination. In this way, the helical antenna in its deployed state is kept under pretension by the control cords. In this way, one ensures that the desired shape of the helical antenna is reliably attained and maintained and that structural stiffness of the antenna is further increased.

The antenna unit includes the above described helical antenna and a reflector plate being connected to the helical antenna.

Preferably, as it is desired for this type of antenna, the reflector plate has a great mass surface. Since the satellite itself does not provide the required surface in the form of electrically conductible material, the reflector plate includes foldable and unfoldable radial antenna rods which are especially arranged at the outer circumference of the reflector plate. The radial antenna rods may include form elements being arranged at the circumference of the reflector plate in a spaced apart manner. These form elements may be designed and arranged to fit in the reflector plate and to be detachable from the reflector plate. The radial antenna rods may be designed similar to a steel tape measure in the sense of including bands which are bent in a direction transverse to the longitudinal direction. These bands may be made of copper beryllium, and they can be located in a groove in the circumferential surface of the reflector plate during their folded state.

Foldable and unfoldable and compressible and deployable, respectively, tangential antenna rods may be connected to and located between the radial antenna rods. These tangential antenna rods may also be designed as bent bands, for example of copper beryllium.

The folded radial antenna rods as well as the folded tangential antenna rods may be compressed by a cord which is tensioned over the circumference of the reflector plate such that the antenna rods automatically deploy after the cord has been cut.

A suitable partition of the tangential antenna rods and their interconnection by electrically conducting flexure hinges, especially including copper, makes it possible to also arrange these in the groove being located in the outer circumference of the reflector plate. The mechanical and electrical connection of the antenna rods with the reflector plate is realized by introducing form elements into the core of the reflector plate during manufacture of the reflector plate. Especially, the reflector plate may be designed as a sandwich plate. Corresponding counterparts of the antenna rods may be afterwards connected to the reflector plate in an exact manner.

Holders may be arranged at the reflector plate, the holders serving to fix the helical antenna in its compressed state at the reflector plate. Especially, the unit includes three or more holders or hold-down devices being arranged at the circumference of the reflector plate in a spaced apart manner. The holders may include an inner part and an outer arm, the inner part being rigidly connected to the reflector plate in a stationary way and the outer arm being rotatably connected to the inner part. The windings of the helical antenna are pushed onto the inner part, and they are fixedly pressed towards the inner part and the reflector plate, respectively, by the outer arm. The free end of the outer rotatable arm extends beyond the circumferential groove in which the radial and tangential antenna rods are located. The arm is kept in place by a surrounding cord. Consequently, when the cord is cut, the arm and the radial and tangential antenna rods are released such that the entire helical antenna self-deploys after the cord has been cut. The arm is rotated towards its end position by two identical springs being located on the rotational axis. The arm is locked in this position also due to frictional engagement.

Preferably, the outer arm is restrained by the cord, and the radial antenna rods and the tangential antenna rods are simultaneously released. After having cut the cord, the movable arms may be rotated by springs into a locked end position.

The reflector plate may be designed as a sandwich plate of carbon fiber composite material being covered with an electrically conducting layer.

Preferably, the helical antenna is formed by a plurality of short segments having an approximately identical angle of inclination and a starting segment and possibly an end segment for attaining the desired shape. Since the entire structure of the helical antenna is then attained by interconnecting separate parts, there almost is no limitation concerning the length of the antenna. In addition, windings of specific sections may have different mechanical or electrical properties. For example, this possibility is used in a way that the electrically conducting part of the helical antenna begins at a certain distance to the reflector plate.

Preferably, the first winding of the helical antenna may be designed such that the angle of inclination diminishes and almost reaches the value of zero at the reflector plate. In this way, the helical antenna can be compressed to attain a minimal volume. Since its diameter changes depending on its length—the compressed helical antenna has a greater diameter than the deployed helical antenna—the longitudinal center axis of the deployed helical antenna is not located in the center of the reflector plate when the helical antenna with the greater diameter of the compressed condition is connected in the center of the reflector plate.

If the geometrical impreciseness is not acceptable for an optimal use of the helical antenna, the helical antenna may also be designed to have a constant angle of inclination and to include a hinge being located at its beginning. The hinge is designed such that also the beginning of the helical antenna is arranged to be parallel to the plane of the reflector plate when the windings of the helical antenna are compressed. In this way, the hinge may be arranged and adjusted such that the longitudinal center axis of the deployed helical antenna coincides with the center of the reflector plate. In this configuration, there will be tensions during compression of the windings when the holders are equally spaced apart about the outer circumferential surface of the reflector plate.

The helical antenna may be arranged in a special foil being suitable for use in outer space. The foil only has a slight influence on the properties of the antenna, and the additionally resulting top loads caused by the foil are used for balancing and tuning, respectively, of the antenna. In addition, the foil serves to stabilize the helical antenna and thus to maintain the desired outer shape.

To manufacture the helical carrier structure made of fiber composite material, it is preferred to use an especially cylindrical mould onto which the helical antenna is wound. If the surface of the mould is smooth, guiding strips for the helical antenna are arranged on the outer surface. The outer diameter of the cylinder then corresponds to the inner diameter of the extended helical antenna. Alternatively, a helical channel serving for supporting the helical antenna may be arranged in the core, especially by milling. The base diameter of the channel then corresponds to the inner diameter of the extended helical antenna. It is also possible that the mould has a different shape to realize special electrical or mechanical properties, for example for the beginning of the helical antenna. For example, elliptical or conical shapes are possible.

For producing the carrier structure of the helical antenna, especially a core of foam material which has been ground to attain the desired size, is covered by one or more fiber fabric hoses. The hoses are then drenched with resin, and they are shrunk by a shrinkable sleeve having great flexibility. The fiber fabric hoses may also be produced in a way that one attains the desired orientation of the fibers during laminating of the fiber fabric hoses on the core of foam material. The rod of the carrier structure which has not yet hardened and which is thus still flexible is wound on the track being marked or milled on and in, respectively, the mould, and it hardens at that place. After hardening of the helical antenna and its demoulding, the shrinking hose is removed from the helical antenna. In the following, for example a thin copper braiding serving as electrical conductor is laminated onto the helical antenna without interruption. The helical antenna is produced in its extended condition, and it is then partly compressed by the control cords to attain the desired shape (length, diameter and angle of inclination) such that the helical antenna is compressed and the control cords are under tension. The control cords are connected to the reflector plate and to the end of the helical antenna. Preferably, they are not rigidly connected to the windings of the helical antenna being located there between.

Other features and advantages of the present invention will become apparent to one with skill in the art upon examination of the following drawings and the detailed description. It is intended that all such additional features and advantages are included herein within the scope of the present invention, as defined by the claims.

BRIEF DESCRIPTION OF THE DRAWINGS

The invention can be better understood with reference to the following drawings. The components in the drawings are not necessarily to scale, emphasis instead is being placed upon clearly illustrating the principles of the present invention. In the drawings, like reference numerals designate corresponding parts throughout the several views.

DETAILED DESCRIPTION

Figure 1:
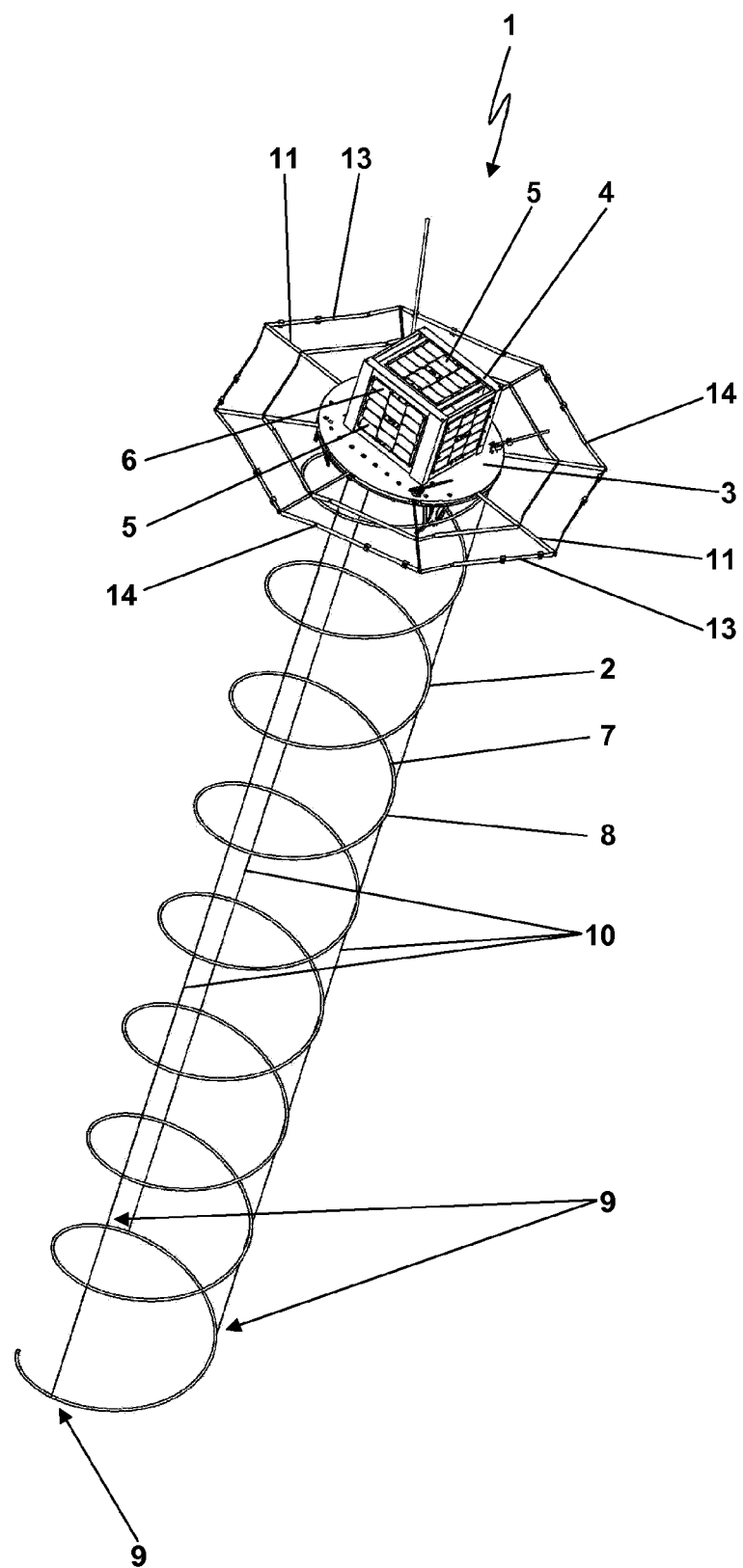
FIG. 1 is a perspective view of a first exemplary embodiment of the novel antenna unit including a helical antenna and a reflector plate.
Figure 2:
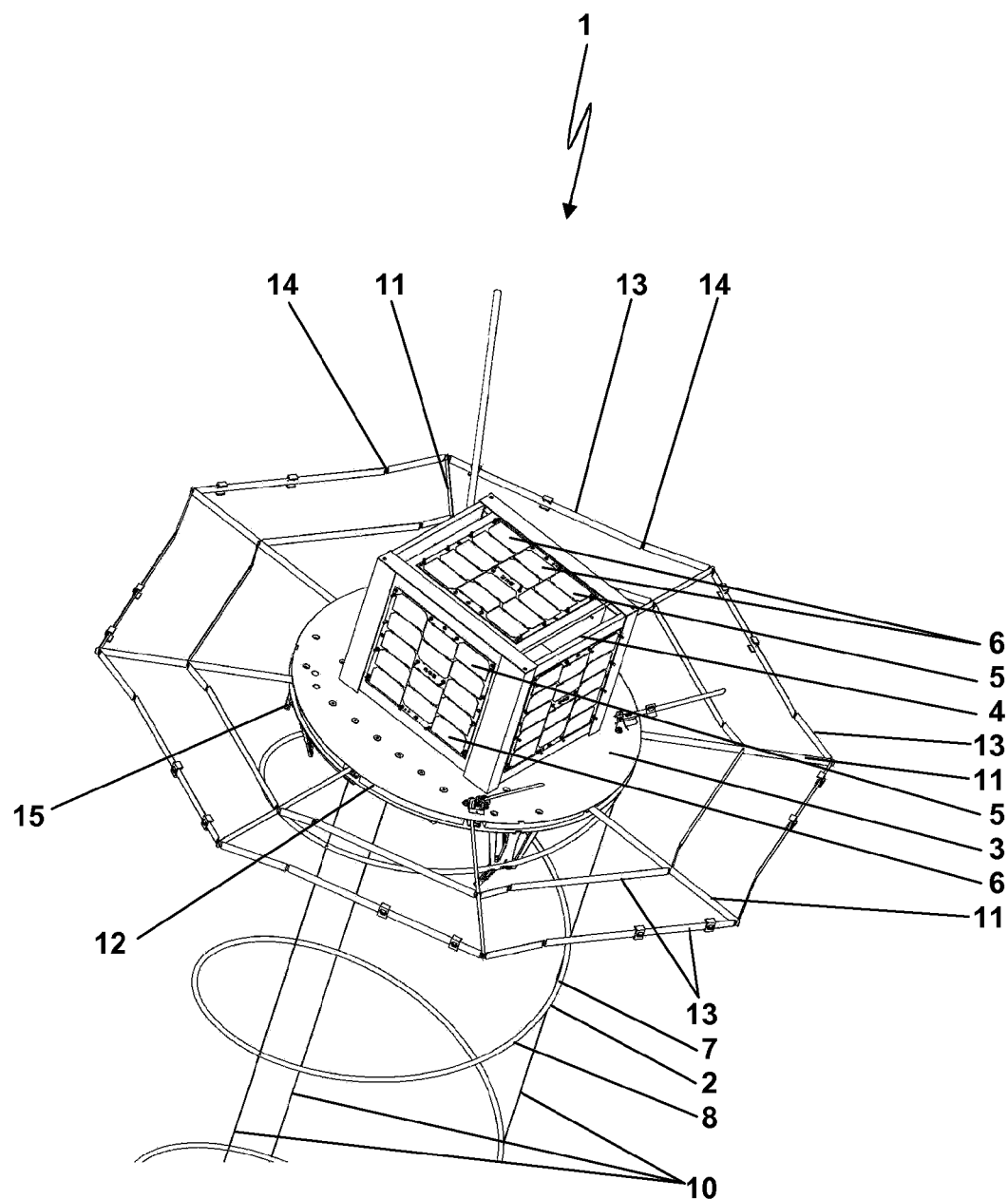
FIG. 2 is an enlarged perspective view of the antenna unit according to FIG. 1.
Figure 3:
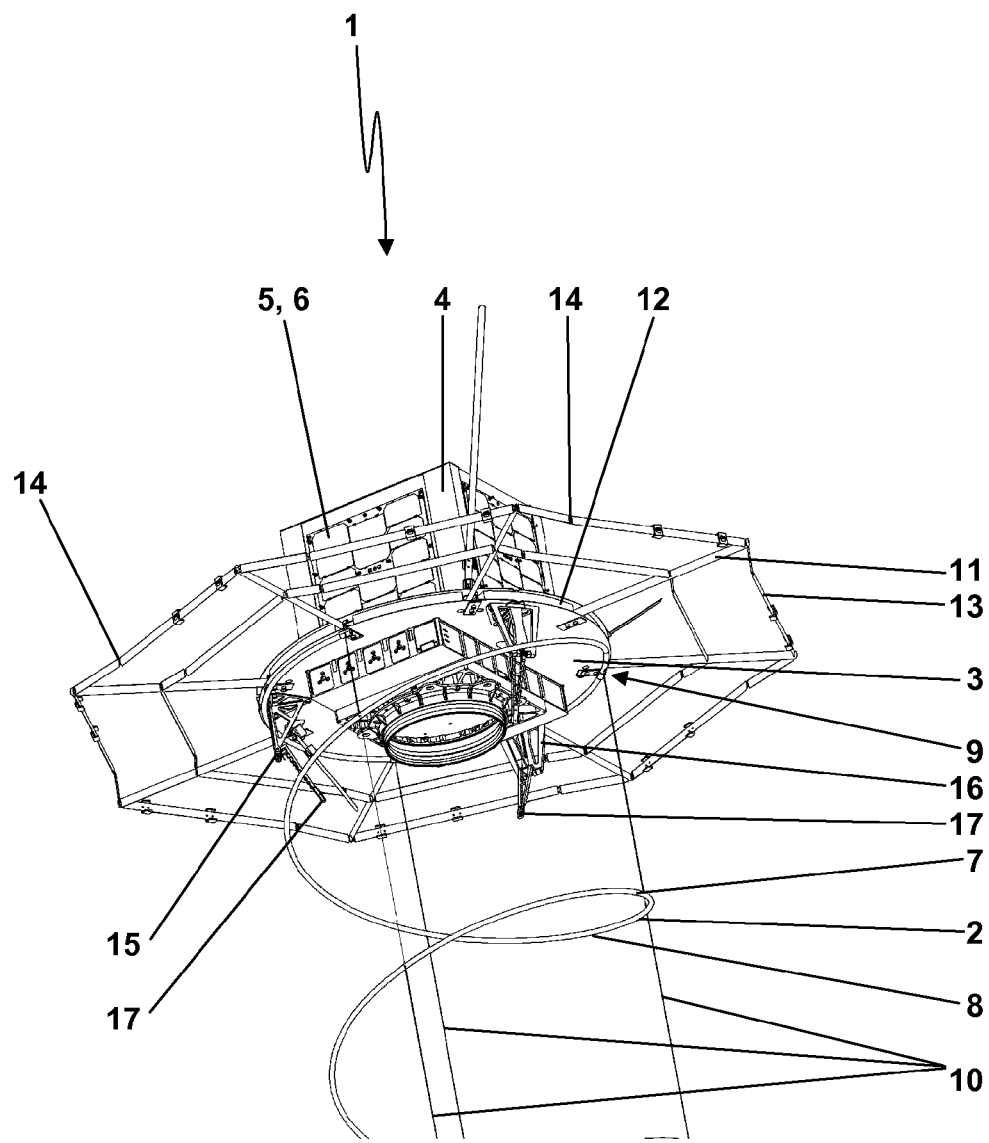
FIG. 3 is another enlarged perspective view of the antenna unit according to FIG. 1.
Figure 4:
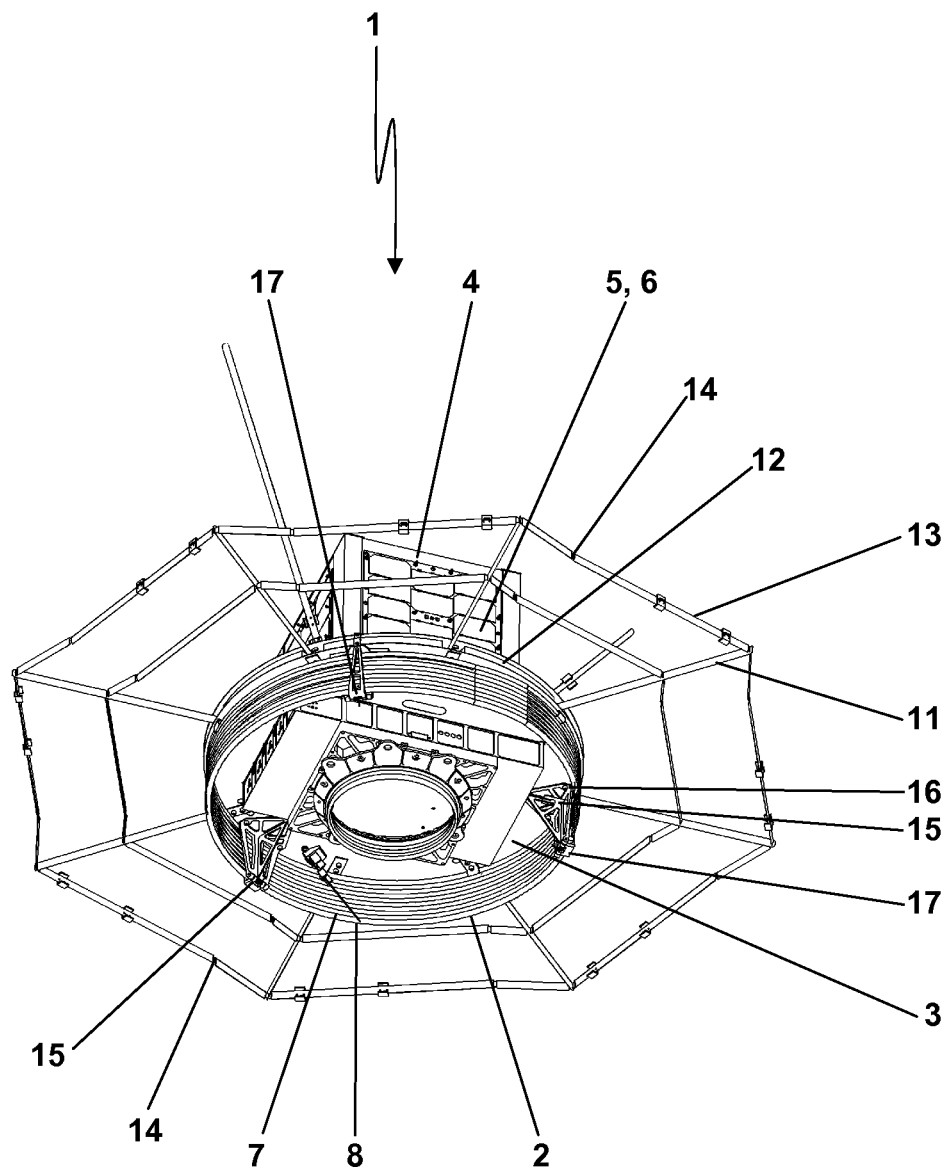
FIG. 4 is another enlarged perspective view of the antenna unit according to FIG. 1.

Referring now in greater detail to the drawings, FIGS. 1 to 4 illustrate different views of an antenna unit 1 including a compressible and deployable helical antenna 2 and a reflector plate 3. The helical antenna 2 is connected to the reflector plate 3. FIGS. 1, 2 and 3 illustrate the helical antenna in its deployed state, whereas FIG. 4 illustrates the helical antenna 2 in its compressed state.

The antenna unit 1 is part of an AIS transmitter and receiver system for use in outer space serving to transmit identification signals of ships in seafaring. Correspondingly, the reflector plate 3 is connected to a satellite 4 including photovoltaic modules 5 including a plurality of solar cells 6 serving for power supply of the satellite 4. The design and functionality of the satellite 4 are known from the prior art such that they will not be described herein in greater detail.

The helical antenna 2 includes a helical carrier structure 7 being made of a sandwich material including a fiber composite material on which an electrically conducting layer 8 is located. The carrier structure 7 includes a core 18, especially of a light material and preferably of a foamed material, and a carrier layer 19 of fiber composite material being located thereon (see FIG. 5). The carrier structure 7 especially includes a carrier layer 19 being made of a fiber braided sleeve 20. The sleeve 20 may be designed as a carbon fiber braided sleeve, an aramid fiber braided sleeve, a glass fiber braided sleeve and the like.

Figure 6:
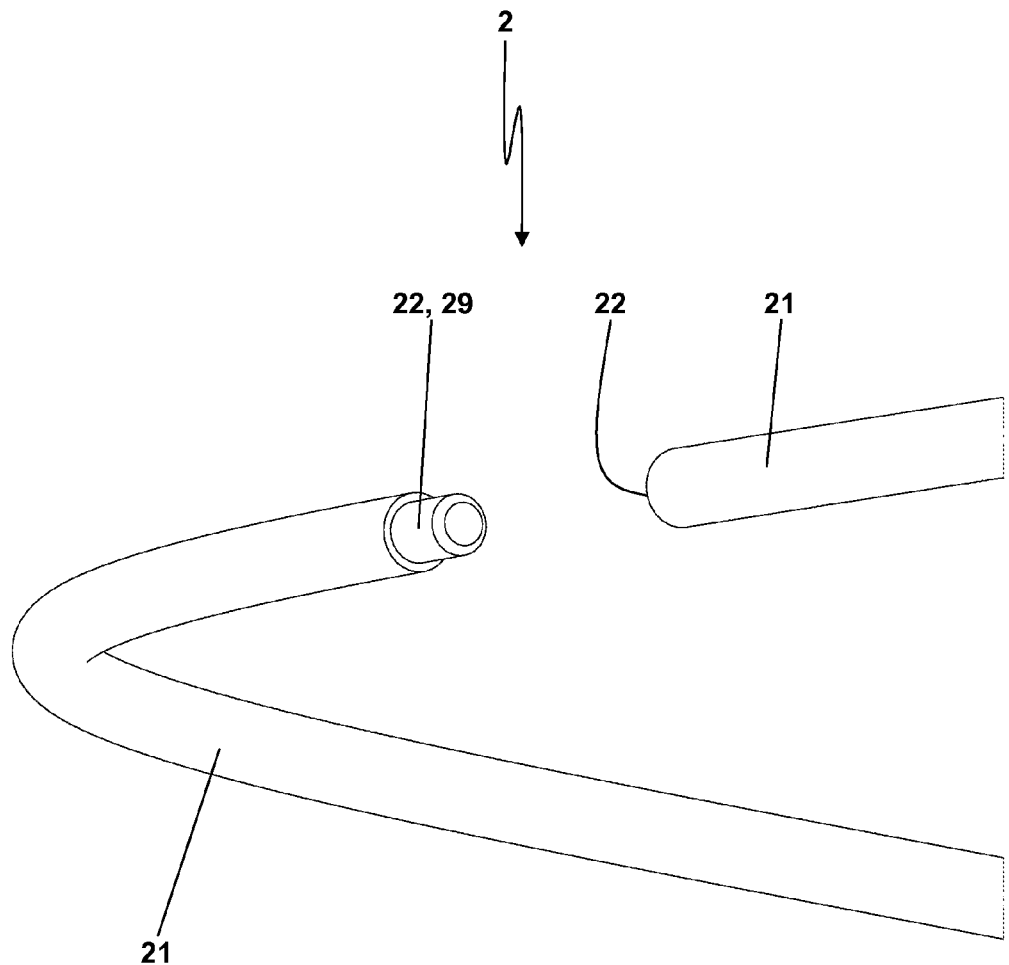
FIG. 6 is a perspective view of two sections of the helical antenna which are interconnected by a glue connection.

The helical carrier structure 7 includes a plurality of helical sections 21 being interconnected by glued connections 22 (see FIG. 6). The helical sections 21 may be made of different fiber materials.

Control cords 10 extending in an axial direction are connected to radial outer portions 9 of the helical carrier structure 7 such that they determine the shape of the helical antenna 2 in its deployed state. The control cords 10 in the region of their ends facing the reflector plate 3 are connected to the helical antenna 2 such that the control cords 10 determine the length, the diameter and the angle of inclination of the helical antenna 2. The control cords 10 keep the helical antenna 2 under pretension, and they are especially made of braided glass fibers. In the present case, the preferred exemplary embodiment including three control cords 10 is illustrated. It is to be understood that it is also possible to use more or less control cords 10.

Another possible embodiment of the helical antenna 2 does not include control cords 10, but instead a cylindrical foil surrounding the helical antenna 2 to determine the length, the diameter and the angle of inclination of the helical antenna 2 in the desired and required way.

The reflector plate 3 of the antenna unit 1 furthermore includes radial antenna rods 11 being designed as foldable and unfoldable antenna rods 11. The radial antenna rods 11 are distributed about the circumference of the reflector plate 3 and located in a groove 12 being located in the outer circumferential surface of the reflector plate 3 when the antenna unit 1 is in its compressed state.

Foldable and unfoldable tangential antenna rods 13 are located between the radial antenna rods 11. The tangential antenna rods 13 have a suitable segmentation, and they include connections including electrically conducting flexure hinges 14, especially including copper, such that they can also be located in the groove 12 being located on the outer circumferential surface of the reflector plate 3.

The reflector plate 3 includes holders 15 being arranged to be spaced apart the circumference of the reflector plate 3. The holders 15 serve to hold the helical antenna 2 in its folded position at the reflector plate 3. The folded or compressed position of the helical antenna 2 is illustrated in FIG. 4. For reasons of clarity of the drawing, the radial antenna rods 11 and the tangential antenna rods 13 are illustrated in their deployed condition although it is preferred that the helical antenna 2 and the antenna rods 11, 13 are designed such that they are either commonly in the compressed condition or in the deployed condition (see FIGS. 7 and 8). For this purpose, they include a common folding an unfolding mechanism.

Figure 9:
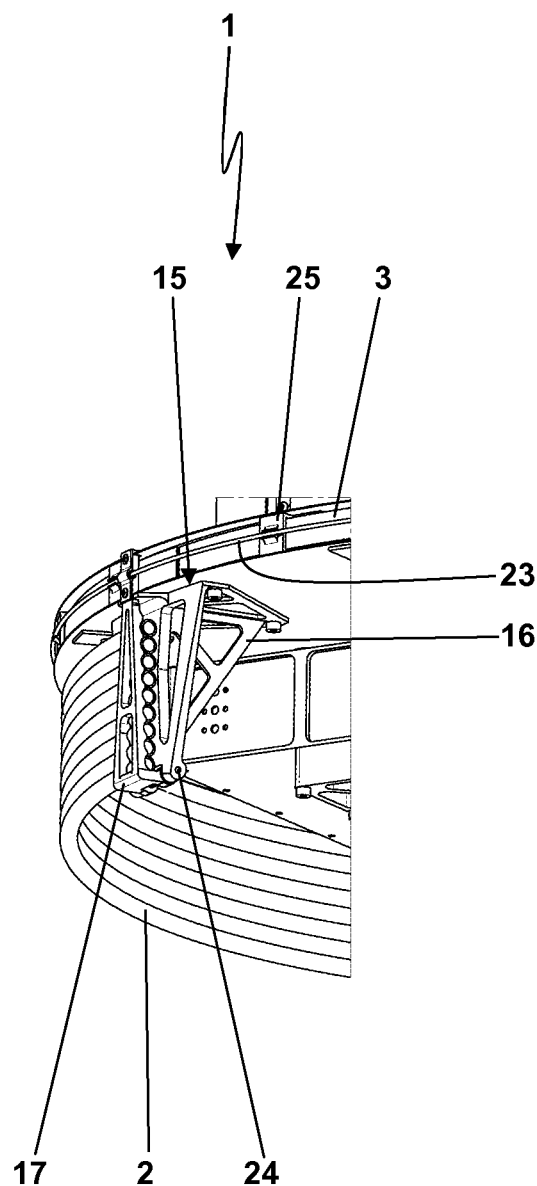
FIG. 9 is an enlarged perspective view of a part of the antenna unit in its compressed state.

The holders 15 include an inner part 16 being rigidly connected to the reflector plate 3 in a stationary way and an outer arm 17 being rotatably connected to the inner part 16 (especially see FIG. 9). The outer arm 17 holds the helical antenna 2 in its compressed condition. The outer arm 17 of the holders 15 in the compressed condition of the helical antenna 2 is pressed in a downward direction by a cord 23 (see FIGS. 7 and 9). Cutting the cord 23 simultaneously releases the radial antenna rods 11 as well as the tangential antenna rods 13 and the helical antenna 2. In this way, the helical antenna 2 and the antenna rods 11, 13 automatically deploy after cutting of the cord 23.

Figure 5:
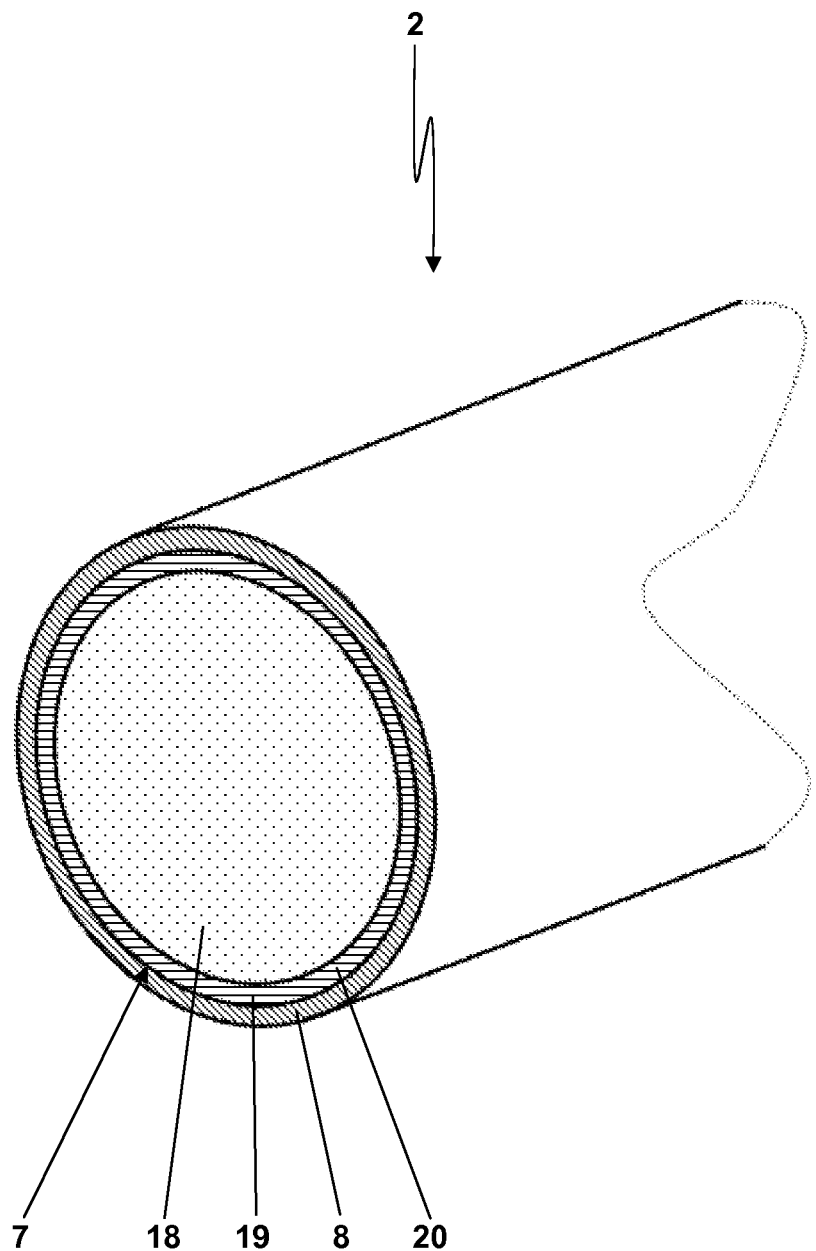
FIG. 5 is a sectional perspective view of the helical antenna including a core, a carrier structure and an electrically conducting layer.

As it is to be seen in FIG. 5, the helical antenna 2 includes the carrier structure 7 and the electrically conducting layer 8. The carrier structure 7 includes an inner core 18 of foam, especially hard foam, and the carrier layer 19. The carrier layer 19 is designed as a fiber braided sleeve 20 in the illustrated embodiment.

As it is to be seen in FIG. 6, the helical antenna 2 may include a plurality of helical sections 21 including connection rods 29 and corresponding openings being interconnected by glue connections 22.

Figure 7:
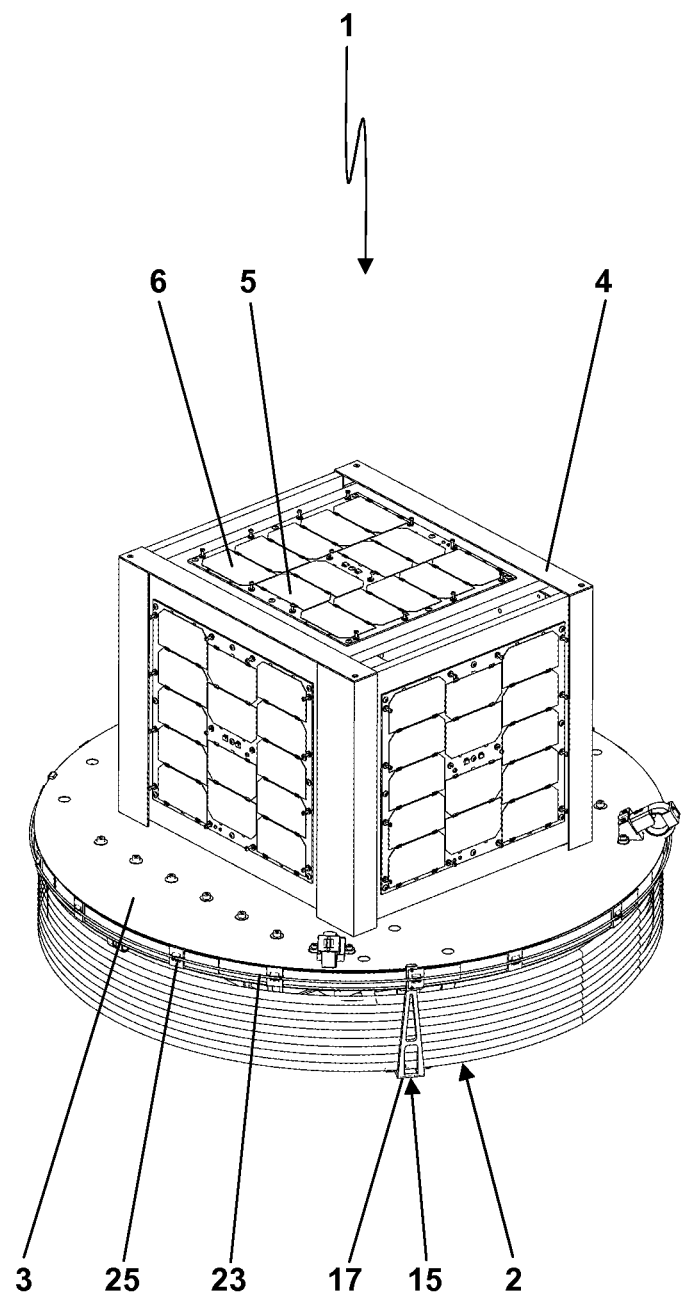
FIG. 7 is a perspective view of the antenna unit according to FIG. 1 in its compressed state.

FIG. 7 illustrates the compressed or folded state of the antenna unit 1. In contrast to the illustration of FIGS. 3 and 4, not only the helical antenna 2, but also the radial antenna rods 11 and the tangential antenna rods 13 are in the compressed or folded state. Furthermore, it is to be seen that the antenna 2 and the antenna rods 11 and 13 are kept in place by the holder 15 and the cord 23.

Figure 8:
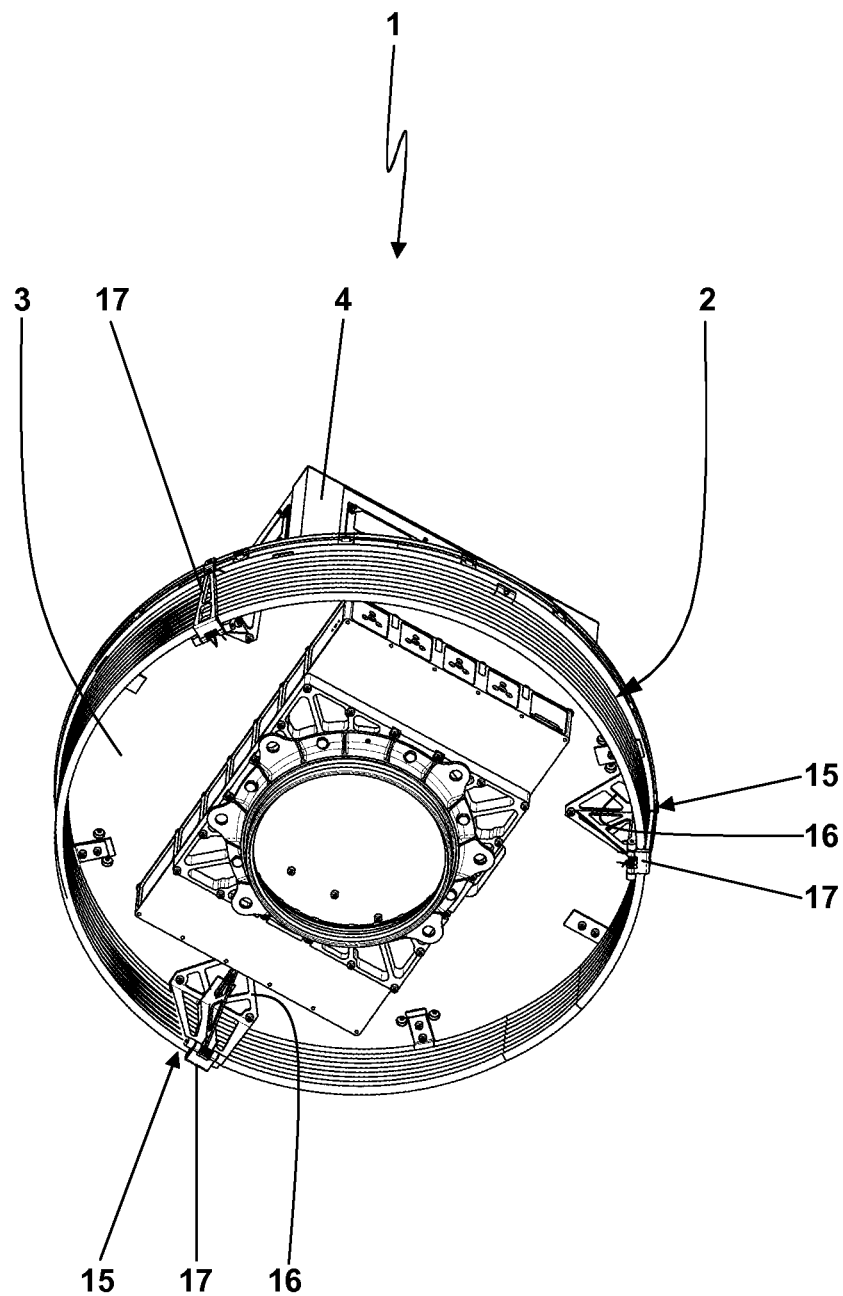
FIG. 8 is a perspective view of the antenna unit of FIG. 7 from below.

FIG. 8 shows the antenna unit 1 according to FIG. 7 from below. Especially, the stationary part 16 and the movable arm 17 of the holder 15 are to be seen. The exact exemplary design of the system for keeping the helical antenna 2 and the rods 11 and 13 in place is even more clearly illustrated in FIG. 9. As it is to be seen there, the arm 17 is connected to the inner part 16 of the holder 17 by a hinge 24 such that it is rotatable with respect to the inner part 16 once it is released. FIG. 9 also illustrates the cord fixing elements 25 which are connected to the rods 13.

Figure 10:
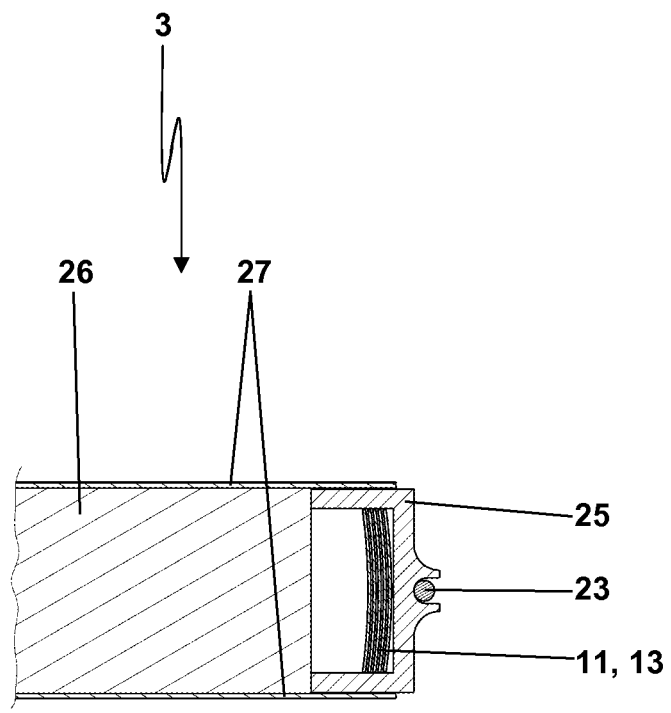
FIG. 10 is a sectional view of the reflector plate of the antenna unit.

FIG. 10 illustrates a sectional view of the reflector plate 3 of the antenna unit 1. The reflector plate 3 is designed as a sandwich plate including an inner core 26 of honeycomb material and a facesheet 27 of carbon fiber composite material with an electrically conducting material on top of the facesheet 27 which points towards the helical antenna 2.

Figure 11:
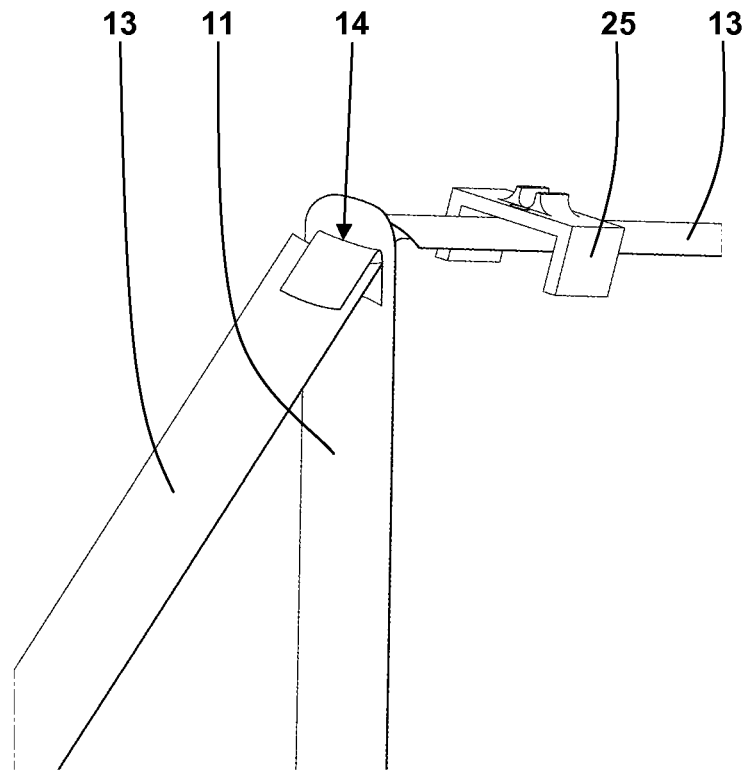
FIG. 11 is a perspective view of radial and tangential antenna rods and a flexure hinge of the antenna unit.

FIG. 11 illustrates a detailed view of the antenna rods 11, 13 being connected by the electrically conducting flexure hinges 14. It is also to be seen that the cord fixing elements 25 are connected to the tangential antenna rod 13.

Figure 12:
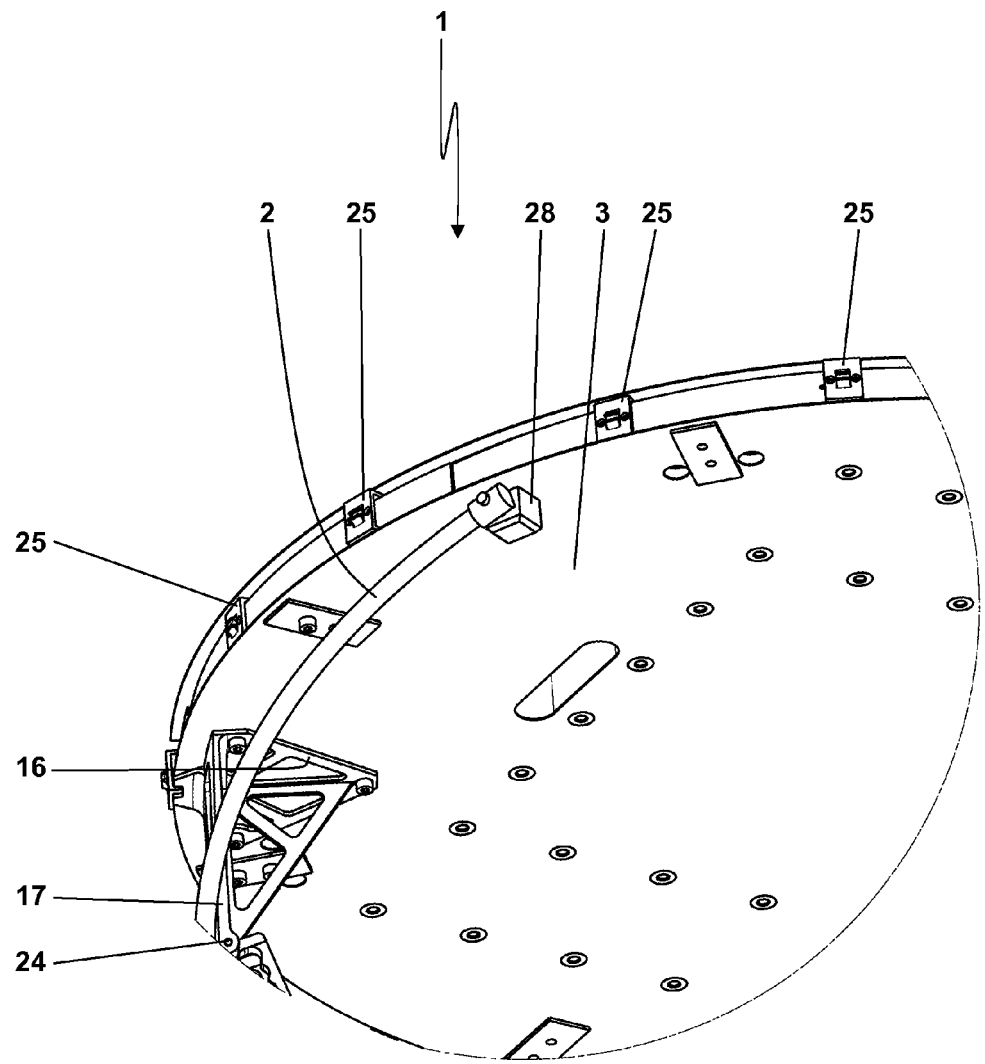
FIG. 12 is an enlarged perspective view of the antenna unit from below.

FIG. 12 illustrates a detailed view of the antenna unit 1 and especially of a hinge 28 by which the beginning of the helical antenna 2 is connected to the bottom side of the reflector plate 3.

Many variations and modifications may be made to the preferred embodiments of the invention without departing substantially from the spirit and principles of the invention. All such modifications and variations are intended to be included herein within the scope of the present invention, as defined by the following claims.

We claim:

1. A compressible and deployable helical antenna having an axial direction and a radial direction, comprising:
    a supporting structure having a helical shape, the supporting structure including a core and a carrier layer of composite fiber material, the carrier layer being located on the core;
    an electrically conducting layer, the electrically conducting layer being located on the carrier layer; and
    a plurality of control cords, the control cords extending in the axial direction and being connected to the outer portions of the helical antenna as seen in the radial direction such that the control cords determine the shape of the helical antenna in its deployed state.

2. The helical antenna of claim 1, wherein the helical antenna has a length in the axial direction, a diameter in the radial direction and a helical angle, the length, the diameter and the helical angle are determined by the control cords.

3. The helical antenna of claim 2, wherein the control cords are designed and arranged to keep the helical antenna in its deployed state under pretension.

4. The helical antenna of claim 3, wherein the control cords are made of braided glass fibers.

5. The helical antenna of claim 1, wherein the core is made of foam material.

6. The helical antenna of claim 5, wherein the foam core material is a polymethacrylimide.

7. The helical antenna of claim 1, wherein the carrier layer is made of a braided sleeve of fibers.

8. The helical antenna of claim 7, wherein the fibers of the braided sleeve of fibers are selected from the group consisting of carbon fibers, aramid fibers and glass fibers.

9. The helical antenna of claim 1, wherein the carrier structure includes a plurality of helical sections being interconnected by glue connections.

10. The helical antenna of claim 9, wherein the glue connections include connection rods being made of fiber composite material.

11. The helical antenna of claim 9, wherein a first helical section of the plurality of helical sections is made of a first fiber material and a second helical section of the plurality of helical sections is made of a second fiber material, the second fiber material being different than the first fiber material.

12. The helical antenna of claim 1, wherein the electrically conducting layer includes a braided sleeve of metal.

13. An antenna unit, comprising: a compressible and deployable helical antenna, including a supporting structure having a helical shape, the supporting structure including a core and a carrier layer of composite fiber material, the carrier layer being located on the core, and an electrically conducting layer, the electrically conducting layer being located on the carrier layer; and a reflector plate, the reflector plate being connected to helical antenna.

14. The antenna unit of claim 13, wherein the helical antenna has an axial direction, a radial direction and a tangential direction, the reflector plate has an outer circumferential surface, the helical antenna further includes a plurality of radial antenna rods, the radial antenna rods being designed and arranged to be compressible and deployable, the radial antenna rods being arranged at the outer circumferential surface of the reflector plate to extend in a radial direction in the deployed state of the radial antenna rods.

15. The antenna unit of claim 14, wherein the outer circumferential surface of the reflector plate includes a channel, and the radial antenna rods are made of arched form elements that are arranged in the channel in the compressed state of the radial antenna rods.

16. The antenna unit of claim 14, further comprising a plurality of tangential antenna rods, the tangential antenna rods being designed and arranged to be compressible and deployable, the tangential antenna rods being located between the radial antenna rods.

17. The antenna unit of claim 16, wherein the tangential antenna rods include a plurality of electrically conducting flexure hinges such that they can be arranged in the circumferential surface of the reflector plate in the compressed state of the tangential antenna rods.

18. The antenna unit of claim 17, further comprising a cord, the radial antenna rods in their compressed state and the tangential antenna rods in their compressed state being depressed by the cord.

19. The antenna unit of claim 18, wherein the radial antenna rods are designed and arranged to be released to deploy in the radial direction and the tangential antenna rods are released to deploy in the tangential direction when the cord has been cut.

20. The antenna unit of claim 13, wherein the reflector plate includes a plurality of holders, the holders being connected to the reflector plate, the holders being designed and arranged to hold the helical antenna in its depressed state at the reflector plate.

21. The antenna unit of claim 20, wherein the holders include an inner part and an outer arm, the inner part being rigidly connected to the reflector plate in a stationary way and the outer arm being connected to the inner part by a hinge, the outer arm holding the helical antenna in its compressed state.

* * * * *